% Patented July 10, 1951

UNITED STATES PATENT OFFICE 2,559,791

ELECTRICAL INSULATING MATERIALS

Pierre Pascal Peyrot, Lyon, and Louis Jean Dumoulin, La Terrasse-sur-Dorley, France, assignors to Societe des Usines Chimiques, Rhone-Poulenc, Paris, France, a corporation of France No Drawing. Application September 9, 1949, Serial No. 114,908. In France October 19, 1948

13 Claims. (Cl. 260—37)

This invention relates to new materials suitable as electrical insulating materials.

In co-pending application Serial No. 94,934, filed May 23, 1949, now Patent 2,546,474, it is explained that it is possible to agglomerate asbestos with an organosilicic resin and to obtain, after suitable treatment of this agglomerate, light materials which have excellent mechanical strength and electrical properties, which are unaffected by the action of moisture, and which are not seriously affected by high temperatures. Such materials are suitable for use without further treatment in numerous fields, such as the electrical and radio-electrical industries, as fire-proof partitions and the like.

It is explained in the said co-pending application that good agglomerates can be obtained with relatively small quantities of resin, provided that the pressure or the temperature employed in the step of agglomeration is higher than would be necessary to obtain agglomerates having equivalent properties with a larger quantity of resin. Thus, for example, by operating under a pressure of 500 kg. per sq. cm., it is possible to obtain good insulating materials consisting of organosilicic resins and asbestos, in which the weight ratio of the resin to the asbestos is only 5:100 while with a pressure of only 50 kg. per sq. cm. the weight of the organosilicic resin would have to be about 20% of the weight of asbestos in order to give a material having comparable mechanical rigidity.

It is, of course, necessary in all cases to employ a quantity of resin sufficient to obtain a rigid material which can be readily mechanically worked by the methods described in the aforesaid application.

It is known that ethyl silicate can be partially hydrolysed to give an ethyl polysilicate capable of acting as an agglomerating agent. Such ethyl polysilicates may be obtained, for example, by adding to ethyl silicate a very dilute solution of hydrochloric acid. However, the materials obtained by agglomerating asbestos with ethyl polysilicates are very bad electrical insulators. Moreover, they are very sensitive to moisture and become frangible under the action of flame. These properties preclude their use as electrical insulators or as fire-proof partitions.

It has now been found, and this forms the basis of the present invention, that if asbestos is agglomerated with a mixture of organosilicic resin and of ethyl polysilicate, it is possible to reduce considerably the quantity of organosilicic resin in the agglomerate and nevertheless to obtain materials which have good mechanical rigidity and which are very good electrical insulators, substantially insensitive to the action of moisture and resistant to the action of heat. Contrary to expectation, such materials are comparable, and in some cases even superior, to agglomerates based on organosilicic resin alone. Moreover, these materials, owing to the reduced proportion of organosilicic resins contained therein, are economically advantageous as compared with agglomerates constituted solely of asbestos and of organosilicic resin.

It is to be clearly understood that the term "organosilicic resin" is used in this application in its ordinarily accepted sense i. e. as meaning a resinous material of which the molecular structure consists essentially of a polysiloxanic chain, organic radicals being directly attached to the silicon atoms.

The organosilicic resins employed may vary widely as regards the number and nature of the organic radicals attached to the silicon atoms. Thus, it is possible to use organosilicic resins substituted by methyl, ethyl, phenyl and like radicals.

In forming the agglomerates of this invention it is desirable to mix the resin and the ethyl polysilicate with the asbestos in the presence of a common solvent for the resin and the ethyl polysilicate. Thus, where the resin employed is a methyl polysiloxane, an alcohol such as methyl or ethyl alcohol, or mixtures of solvents based on such alcohols are suitable. If the organosilicic resins employed are resins substituted by both methyl and phenyl radicals, they can be dissolved in benzene, which is also a solvent for ethyl polysilicate.

The organosilicic resin can be mixed with the ethyl polysilicate in various ways. For example, an alcoholic solution of ethyl polysilicate can be prepared by partially hydrolysing ethyl silicate (pure or already containing some ethyl polysilicate) either alone or in alcoholic solution by means of very dilute hydrochloric acid, and this solution may be mixed with an organosilicic resin, the latter being in the solid state or in solution. Alternatively the ethyl silicate may be added to the resin solution, alcohol added if the medium is not already alcoholic, and this complex solution subjected to hydrolysis by adding very dilute hydrochloric acid.

The asbestos may be in various forms, such as felt, flock, loaded asbestos and the like. The impregnation of the asbestos by these complex solutions of ethyl polysilicate and organosilicic resin can be carried out by the methods described in the aforesaid co-pending application. After a light preheating in an oven under normal pressure or reduced pressure at temperatures of the order of 100° C. (this preheating being optional), the agglomeration is effected under pressure in a heating press.

As explained in the said co-pending application each of the factors by means of which the quality of the agglomerates can be controlled ( i. e. the quantity of agglomerating substance, the temperature, the pressure and the duration of treatment) can, if applied with sufficient intensity, compensate largely for an insufficiency in one or more other factors. Where all other conditions are held constant the influence of an increase of temperature is quite remarkable. Thus, baking at about 300° C. or more gives very much better results than baking at about 200° C., at equal pressure and with an equal quantity of agglomerant.

The respective quantities of the two constituents of the agglomerating mixture to be employed in accordance with the present invention may vary and the selection of the quantities will depend upon the pressure to be applied during the agglomerating process. With pressures of the order of 400 kg. per sq. cm. agglomerates are obtained which have the excellent properties referred to above, by employing from 2 to 20 parts by weight of resin and from 5 to 20 parts by weight of ethyl polysilicate per 100 parts of asbestos. Preferably, with these pressures a total quantity of agglomerant (resin and ethyl polysilicate) is employed which amounts to 10 to 30 parts per 100 parts of asbestos. Using higher pressures, the quantity of agglomerant can be substantially reduced. Thus, Example VIII which is set out hereinafter describes an agglomerate prepared under a pressure of 2500 kg. per sq. cm., in which 0.5 part of organosilicic resin and 2.5 parts of ethyl polysilicate are employed per 100 parts of asbestos, i. e. 3 parts of agglomerant per 100 parts of asbestos.

The materials obtained under the conditions described above are water-proof and mechanically rigid. They have, on being struck, a sonorousness which is similar to that of an iron plate and they can be worked with a tool, for example by piercing, sawing, turning and the like. They are very poor conductors of heat and have good electrical properties. These various properties render them suitable for the most varied uses, for example as insulators in the electrical and radioelectrical industries, as thermal insulators and especially as fireproof partitions, for example in aircraft construction and ship-building.

The following examples serve to illustrate the invention but are not to be regarded as limiting it in any way.

In these examples, the parts are understood to be by volume, unless otherwise specified. Where the expression "parts by weight" is used it is intended to mean the weight of that same number of parts by volume of water at 4° C.

EXAMPLE 1

A solution of ethyl polysilicate is prepared by hydrolysing 50 parts of technical ethyl silicate with 10 parts of water containing 2.3% by weight of hydrochloric acid. This solution, which at first is turbid, becomes limpid when stirred. To 9.6 parts of this solution are added 85.4 parts of methyl alcohol and 5 parts of a 50% solution (weight/volume) in a mixture of benzene and ethyl acetate, of a methyl polysiloxane resin having a $CH_3:Si$ ratio equal to 1.25. (The $CH_3:Si$ ratio is the ratio of that number of methyl radicals to the number of silicon atoms in the molecule).

100 parts by weight of asbestos felt are impregnated with 100 parts of the solution thus prepared and the impregnated felt is heated for 15 minutes at 100° C. in a vacuum oven. The agglomeration is completed by baking under a pressure of 300 kg. per sq. cm. for 2 hours at 320° C. In this way, a well bound, hard and sonorous agglomerate is obtained.

By varying the proportions of organosilicic resin the impregnating solution, agglomerates are obtained whose properties differ slightly from those of the agglomerates prepared in the manner described above. The following Table I shows the properties of the different agglomerates thus obtained. For purposes of comparison, there have been added to the table the properties of an agglomerate obtained under the same conditions with ethyl polysilicate alone.

In the following table, as in these subsequently given, there are shown:

In column 1, the percentage of organosilicic resin calculated on the weight of the asbestos.
In column 2, the percentage of ethyl polysilicate calculated on the weight of the asbestos.
In column 3, the mechanical properties.
In column 4, the tg δ value (dielectric dissipation factor, such as defined in ASTM–D.140–44 T)
In column 5, the resistivity $\delta$ in ohm-cms.
In column 6, the percentage of water absorbed after immersion in water for 24 hours.
In column 7, the resistivity $\delta$ in ohm-cms. after immersion in water for 24 hours.

*Table I*

| 1 | 2 | 3 | 4 | 5 | 6 | 7 |
|---|---|---|---|---|---|---|
| 0 | 8 | soft | 0.64 | $2.10^9$ | 93 | $<6.10^4$ |
| 2.5 | 8 | hard and sonorous | 0.17 | $2.10^{11}$ | 6.2 | $2.10^9$ |
| 5 | 8 | ------do------ | 0.16 | $2.10^{11}$ | 4.5 | $2.10^9$ |
| 20 | 8 | ------do------ | 0.26 | $2.10^{11}$ | 2.3 | $7.10^9$ |

It is to be noted from the above Table I that the board obtained with ethyl polysilicate alone as agglomerant is soft and badly agglomerated, while the others are hard and rigid.

With a larger proportion of ethylpolysilicate relative to the asbestos and using increasing proportions of resin, agglomerates having the following properties are obtained.

*Table II*

| 1 | 2 | 3 | 4 | 5 | 6 | 7 |
|---|---|---|---|---|---|---|
| 0 | 16 | Poorly agglomerated | 0.70 | $1.10^8$ | 53 | $6.10^4$ |
| 2.5 | 16 | Hard and sonorous | 0.40 | $4.10^9$ | 8.5 | $2.10^8$ |
| 5 | 16 | ------do------ | 0.38 | $7.10^9$ | 8.5 | $2.10^8$ |
| 10 | 16 | ------do------ | 0.32 | $1.10^{10}$ | 7.6 | $3.10^8$ |
| 20 | 16 | ------do------ | 0.28 | $3.10^{10}$ | 4 | $3.10^9$ |

The agglomerates obtained therefore have in general inferior properties to those of the last three horizontal columns of Table I.

The agglomeration of the asbestos by the mixed organosilicic resin and ethyl polysilicate constitutes an entirely different treatment from one consisting in agglomerating an asbestos board with ethyl polysilicate by treatment in a press under heat and then treating this agglomerate with an organo-silicic resin solution.

Thus, if asbestos board is agglomerated by immersing it in the solution of ethyl polysilicate prepared as described in the foregoing example, a rigid agglomerate is obtained after treatment in a press for sixteen hours at 100° C. under a pressure of 300 kg. If this board is treated with a solution or organosilicic resin so that 2.5% of resin remains in the board, calculated on the quantity of asbestos, there is obtained, after baking for 2 hours at 200° C. an agglomerate whose tg $\delta$ value is higher than 0.70, whose dry resistivity is $2.10^7$ ohm-cms., whose absorption of water after immersion is 30% and whose resistivity after immersion is lower than $6.10^4$ ohm-cms. Such a product is practically unusable as an electrical insulator.

EXAMPLE II

The following solution was prepared:

|  | Parts |
|---|---|
| Technical ethyl silicate | 10 |
| 50% solution (volume/weight) of methylpolysiloxane resin ($CH_3:Si=1.25$) in a mixture of benzene and ethyl acetate | 10 |

(This solution is stable.)

There are added to this solution:

|  | Parts |
|---|---|
| Methanol | 78 |
| Water containing 2.3% by weight of hydrochloric acid | 2 |

After stirring for 30 minutes a complex solution is obtained. 100 parts by weight of asbestos felt are impregnated with 100 parts of this solution. After drying for 15 minutes in a vacuum oven at 100° C. and baking for 2 hours at 320° C. under a pressure of 300 kg. per sq. cm., an agglomerate is obtained which has a tg $\delta$ value of 0.16 and a resistivity of $2.10^{11}$ ohm-cms. On immersion for 24 hours in water, this agglomerate absorbs only 8.5% of its weight of water and still has a resistivity of $2.10^9$ ohm-cms.

EXAMPLE III

By following the procedure of Example I, but baking at 200° C. only, agglomerates having the properties set out in Table III are obtained.

Table III

| 1 | 2 | 3 | 4 | 5 | 6 | 7 |
|---|---|---|---|---|---|---|
| 5 | 8 | hard and sonorous | 0.54 | $2.10^{10}$ | 6.6 | $1.10^3$ |
| 0 | 16 | do | >0.70 | $4.10^7$ | 10.5 | $<6.10^4$ |
| 2.5 | 16 | do | >0.70 | $5.10^8$ | 11.2 | $1.10^7$ |
| 5 | 16 | do | 0.70 | $2.10^9$ | 7.5 | $2.10^7$ |
| 10 | 16 | do | 0.62 | $2.10^9$ | 8 | $3.10^7$ |

By way of comparison, agglomerates highly loaded with ethyl polysilicate and similarly prepared have the properties set out in Table IV.

Table IV

| 1 | 2 | 3 | 4 | 5 | 6 | 7 |
|---|---|---|---|---|---|---|
| 0 | 80 | hard and sonorous | 0.62 | $3.10^8$ | 25 | $<6.10^4$ |
| 5 | 72 | do | 0.62 | $2.10^8$ | 30 | $<6.10^4$ |

EXAMPLE IV

The following solution is prepared:

|  | Parts |
|---|---|
| Ethyl silicate (technical) | 136 |
| 50% solution (volume/weight) of methylpolysiloxane resin ($CH_3:Si=1.25$) in benzene-ethyl acetate mixture | 50 |

Immediately before use there is added:

|  | Parts |
|---|---|
| Methanol | 797 |
| Water containing 0.93% of its weight of hydrochloric acid | 17 |

The resulting solution is stirred and used for impregnating asbestos felt under the same conditions as described in the preceding examples. The impregnated felt is baked for 1½ hours at 350° C. and a pressure of 300 kg. per sq. cm. A hard and sonorous agglomerate having a resistivity of $2.10^{11}$ ohm-cms. and a tagent $\delta$ value of 0.16 is obtained.

EXAMPLE V 1000 parts of ethyl silicate are mixed with 500 parts of methanol and 125 parts of water containing 0.98% by weight of hydrochloric acid. After stirring for 30 minutes, 22 parts of the solution are mixed with 73 parts of methanol and 5 parts of a 50% solution of an organosilicic resin as defined in Example IV.

The properties of asbestos board impregnated with this solution, preheated at 100° C. for 15 minutes in vacuo and baked for 2 hours at 320° C. under a pressure of 300 kg. are set out in Table V.

Table V

| 1 | 2 | 3 | 4 | 5 | 6 | 7 |
|---|---|---|---|---|---|---|
| 2.5 | 13.5 | hard and sonorous | 0.07 | $2.10^{11}$ | 5 | $2.10^9$ |

This is an excellent agglomerate having a remarkably low tg $\delta$ value for a material having an asbestos base.

EXAMPLE VI

There are mixed:

|  | Parts |
|---|---|
| Organosilicic resin as described in Example IV | 50 |
| Pure ethyl silicate | 150 |

To 250 parts of this solution are added:

|  | Parts |
|---|---|
| Methanol | 725 |
| Water containing 1.9% by weight of hydrochloric acid | 25 |

The properties of an asbestos felt impregnated with this solution, preheated for 15 minutes at 100° C. in vacuo and baked under a pressure of 300 kg. for 1 hour at 320° C. are set out in Table VI.

Table VI

| 1 | 2 | 3 | 4 | 5 | 6 | 7 |
|---|---|---|---|---|---|---|
| 3.1 | 18.7 | Hard and sonorous | 0.15 | $2.10^{11}$ | 7.7 | $5.10^7$ |

EXAMPLE VII 1000 parts of technical ethyl silicate are mixed with 500 parts of methanol and 125 parts of water containing 0.98% by weight of hydrochloric acid. After stirring for 30 minutes, 22 parts of the solution are mixed with 73 parts of benzene and 5 parts of a 50% solution of organosilicic resin substituted by both methyl and phenyl radicals. By the use of this solution an agglomerate is obtained in which the silicate asbestos ratio is equal to 13.5:100 and the resin asbestos ratio is equal to 2.5:100, After preheating for 5 minutes at 100° C. in vacuo and baking for 2 hours at 350° C. under a pressure of 300 kg. per sq. cm., an insulating material is obtained, of which the tg δ value is equal to 0.07 and the resistivity is greater than $10^{11}$ ohm-cms.

EXAMPLE VIII

A solution of technical ethyl silicate is hydrolysed as described in Example VII, and to 4 parts of this hydrolysed solution are added 95 parts of methanol and 1 part of a 50% solution (weight/volume), in a mixture of benzene and ethyl acetate, of an organosilicic resin substituted by methyl radicals.

After preheating for 5 minutes at 100° C., an asbestos felt impregnated with this solution is baked under a pressure of 2500 kg. per sq. cm. for 2 hours at 350° C. In this way, an insulating material is obtained, in which the ratio of the weight of the resin to that of the asbestos is 0.5:100 and that of the weight of the silicate to the weight of the asbestos is only 2.5:100. This material is well agglomerated, its tg δ value is equal to 0.25 and its resistivity is higher than $10^{11}$ ohm-cms.

If it were desired to obtain a comparable material agglomerated with resin alone under the same conditions, it would have to contain at least 2.5% of resin with respect to the asbestos.

EXAMPLE IX 5 parts of ethyl polysilicate distilling between 210 and 280° C., obtained as a residue on rectification of technical ethylsilicate, are dissolved in 90 parts of methanol.

There are added to this solution 5 parts of a 50% solution (volume/weight) of a methylpolysiloxane resin ($CH_3 : Si = 1.25$) in a mixture of benzene and ethyl acetate.

100 parts by weight of asbestos felt are impregnated with 100 parts of this solution. After drying for 30 minutes in a vacuum oven at 100° C. in order to eliminate the solvent and baking for 2 hours at 350° C. under a pressure of 300 kg. per sq. cm., a rigid and sonorous material is obtained having a tan δ value of 0.30, a resistivity of $6.10^{11}$ ohm-cms. and a resistivity after immersion of $6.10^7$ ohm-cms.

We claim:

1. A mechanically rigid agglomerate consisting essentially of asbestos, a heat-insolubilised organosilicic resin consisting of a polysiloxane chain containing as sole substituents hydrocarbon groups attached directly to silicon atoms and ethyl polysilicate.

2. A mechanically rigid agglomerate consisting essentially of asbestos, a heat-insolubilised organosilicic resin consisting of a polysiloxane chain containing as sole substituents hydrocarbon groups attached directly to silicon atoms and ethyl polysilicate, the organosilicic resin being present in a proportion of 0.5 to 20 parts by weight and the ethyl polysilicate in a proportion of 2.5 to 20 parts by weight per 100 parts by weight of asbestos, the said agglomerate having a tg δ value lower than 0.70 and a resistivity, after immersion in water for 24 hours, of at least $1 \times 10^7$ ohm-cms.

3. A mechanically rigid agglomerate consisting essentially of asbestos, a heat-insolubilised methyl polysiloxane resin and ethyl polysilicate, the methyl polysiloxane resin being present in a proportion of 0.5 to 20 parts by weight and the ethyl polysilicate in a proportion of 2.5 to 20 parts by weight per 100 parts by weight of asbestos, the said agglomerate having a tg δ value lower than 0.70 and a resistivity, after immersion in water for 24 hours, of at least $1 \times 10^7$ ohm-cms.

4. Process for the production of a mechanically rigid agglomerate of high electrical resistivity and good thermal insulating properties which comprises impregnating asbestos with a mixture of an organosilicic resin consisting of a polysiloxane chain containing as sole substituents hydrocarbon groups attached directly to silicon atoms and ethyl polysilicate and subjecting the impregnated asbestos to the action of heat and pressure at least sufficient to insolubilise the said organosilicic resin.

5. Process for the production of a mechanically rigid agglomerate of high electrical resistivity and good thermal insulating properties which comprises impregnating asbestos with a mixture of an organosilicic resin consisting of a polysiloxane chain containing as sole substituents hydrocarbon groups attached directly to silicon atoms and ethyl polysilicate and subjecting the impregnated asbestos under pressure to the action of heat at a temperature substantially higher than necessary to insolubilise the said organosilicic resin.

6. Process for the production of a mechanically rigid agglomerate of high electrical resistivity and good thermal insulating properties which comprises impregnating asbestos with a mixture of a methyl polysiloxane resin and ethyl polysilicate and subjecting the impregnated asbestos to the action of heat and pressure at least sufficient to insolubilise the said methyl polysiloxane resin.

7. Process for the production of a mechanically rigid agglomerate of high electrical resistivity and good thermal insulating properties which comprises impregnating asbestos with a mixture of a methyl polysiloxane resin and ethyl polysilicate and subjecting the impregnated asbestos under pressure to the action of heat at a temperature substantially higher than necessary to insolubilise the said methyl polysiloxane resin.

8. Process for the production of a mechanically rigid agglomerate of high electrical resistivity and good thermal insulating properties which comprises impregnating asbestos with a mixture of an organosilicic resin consisting of a polysiloxane chain containing as sole substituents hydrocarbon groups attached directly to silicon atoms and ethyl polysilicate in a solvent common for the said resin and the said ethyl polysilicate and subjecting the impregnated asbestos to the action of heat and pressure at least sufficient to insolubilise the said organosilicic resin.

9. Process for the production of a mechanically rigid agglomerate of high electrical resistivity and good thermal insulating properties which comprises impregnating asbestos with a mixture of a methyl polysiloxane resin and ethyl polysilicate in alcoholic solution and subjecting the impregnated asbestos to the action of heat and pressure at least sufficient to insolubilise the said methyl polysiloxane resin.

10. Process for the production of a mechanically rigid agglomerate of high electrical resistivity and good thermal insulating properties which comprises forming a solution, in a common solvent, of an organosilicic resin consisting of a polysiloxane chain containing as sole substituents hydrocarbon groups attached directly to silicon atoms and ethyl silicate, diluting the said solution with methanol and water containing a small quantity of hydrochloric acid, stirring the solution to facilitate hydrolysis of the said ethyl silicate, impregnating asbestos with the resulting solution and subjecting the impregnated asbestos to heat and pressure at least sufficient to insolubilise the said organosilicic resin.

11. Process for the production of a mechanically rigid agglomerate of high electrical resistivity and good thermal insulating properties which comprises forming a solution, in a common solvent, of a methyl polysiloxane resin and ethyl silicate, diluting the said solution with methanol and water containing a small quantity of hydrochloric acid, stirring the solution to facilitate hydrolysis of the said ethyl silicate, impregnating asbestos with the resulting solution and subjecting the impregnated asbestos to heat and pressure at least sufficient to insolubilise the said methyl polysiloxane resin.

12. Process for the production of a mechanically rigid agglomerate of high electrical resistivity and good thermal insulating properties which comprises impregnating asbestos with a mixture of an organosilicic resin consisting of a polysiloxane chain containing as sole substituents hydrocarbon groups attached directly to silicon atoms and ethyl polysilicate and subjecting the impregnated asbestos to the action of heat at a temperature of at least 200° C. and a pressure of at least 300 kg. per sq. cm.

13. Process for the production of a mechanically rigid agglomerate of high electrical resistivity and good thermal insulating properties which comprises impregnating asbestos with a mixture of a methyl polysiloxane resin and ethyl polysilicate and subjecting the impregnated asbestos to the action of heat at a temperature of at least 200° C. and a pressure of at least 300 kg. per sq. cm.

PIERRE PASCAL PEYROT.
LOUIS JEAN DUMOULIN.

REFERENCES CITED

The following references are of record in the file of this patent:

UNITED STATES PATENTS

| Number | Name | Date |
|---|---|---|
| 2,258,218 | Rochow | Oct. 7, 1941 |
| 2,397,727 | Daudt | Apr. 2, 1946 |
| 2,446,135 | Hyde | July 27, 1948 |